United States Patent [19]
Shen et al.

[11] Patent Number: 6,127,761
[45] Date of Patent: Oct. 3, 2000

[54] GENERATOR STATOR END WINDING SEAL

[75] Inventors: Liping Shen; James J. Grant, both of Niskayuna; Steven C. Walko, Clifton Park, all of N.Y.

[73] Assignee: General Electric Co., Schenectady, N.Y.

[21] Appl. No.: 09/421,159

[22] Filed: Oct. 19, 1999

[51] Int. Cl.$^7$ .............................. H02K 3/46; H02K 5/10; H02K 1/00; H02K 3/00; H02K 3/48

[52] U.S. Cl. ............................ 310/260; 310/270; 310/85; 310/91; 310/179; 310/180; 310/194; 310/214

[58] Field of Search .................................. 310/13, 51, 85, 310/89, 91, 140, 141, 144, 179, 180, 194, 200, 214, 235, 258, 260, 270

[56] References Cited

U.S. PATENT DOCUMENTS 3,979,822  9/1976  Halm ......................................... 29/596

5,214,324  5/1993  Holmes ..................................... 310/52

*Primary Examiner*—Nestor Ramirez
*Assistant Examiner*—Guillermo Perez
*Attorney, Agent, or Firm*—Nixon & Vanderhye

[57] ABSTRACT

A seal for a generator stator end winding seals the gap between the annular air shield and a radially inner surface of the stator end winding. The seal includes a first flat piece layer formed of a flexible rubber material and having an inner diameter side and an outer diameter side. A plurality of first radial slits are formed across the outer diameter side. A second flat piece layer is disposed in a layered configuration with the first flat piece layer. The second flat piece layer is formed of the same flexible rubber material. A plurality of second radial slits are formed across the outer diameter side of the second flat piece layer and are offset from the first radial slits in the layered configuration. The seal is secured in a radial groove formed in an end of the air shield by a locking dowel and/or glue. With this arrangement, a reliable seal is configured that is inexpensive to manufacture and easy to install.

12 Claims, 3 Drawing Sheets

GENERATOR STATOR END WINDING SEAL

BACKGROUND OF THE INVENTION

This invention relates to a generator stator end winding seal design and, more particularly, to a seal ring that effectively seals the gap between an air shield and an end winding inner surface in a generator stator.

A reverse flow generator design requires an air flow chamber wall at an end winding area, which is made up by a second row of the end winding blocking, a seal, and the outer surface of an air shield. With proper sealing, air flow will flow radially through the outboard section of the end winding first and then flow back at the inboard section of the end winding, thereby cooling the stator end winding. FIG. 1 illustrates a desired air flow path in a reverse flow generator.

The end winding in a generator stator has an irregular inner surface due to its construction, and air leakage, both radially and axially is a concern. That is, sufficient air flow across the end winding is necessary to prevent overheating. The stator end winding is configured with the air shield to direct the flow along a predetermined air flow path to cool the end winding. Air leakage along the flow path is thus contrary to design considerations, and thereby increases the end winding susceptibility to overheating.

In addition, in the stator end winding area, configuration components attached to the end winding area must be checked closely for insulation material wear out due to vibration, etc. Thus, a seal in the end winding area should be constructed of materials or particularly configured to reduce insulation material wear due to relative motion. At a minimum, a component in the end winding area such as a seal ring should be fixed securely on the end winding. In this context, however, because the top stator bars will have been previously installed, the work space in the end winding area is limited, which may cause manufacturing productivity issues and may increase assembly cycle time.

BRIEF SUMMARY OF THE INVENTION

It would thus be beneficial to provide a seal ring that seals the gap between the air shield and an inner surface of the end winding that minimizes air flow leakage while providing a positive seal, avoids insulation material wear out, is easy to install and can be manufactured at low costs.

In an exemplary embodiment of the invention, a seal for a generator stator end winding includes a first flat piece layer formed of a flexible rubber material, preferably silicon rubber, and having an inner diameter side and an outer diameter side. A plurality of first radial slits are formed across the outer diameter side. A second flat piece layer is disposed in a layered configuration with the first flat piece layer and is formed of the flexible rubber material. The second flat piece layer has an inner diameter side and an outer diameter side, wherein a plurality of second radial slits are formed across the second layer outer diameter side. The second radial slits are offset from the first radial slits in the layered configuration.

A stress release hole is preferably provided at radially inward ends of each of the first radial slits and the second radial slits. Ends of the first flat piece layer and the second flat piece layer may be cut at an angle, and the layered configuration of the first flat piece layer and the second flat piece layer preferably defines one segment such that a plurality of segments are aligned end-to-end to form a circumferential seal. Each of the first flat piece layer and the second flat piece layer includes at least one locking dowel hole for cooperating with a locking dowel.

In another exemplary embodiment of the invention, a seal arrangement for a generator stator end winding including an annular shield spaced from the end winding includes a first flat piece layer formed of a flexible rubber material and having an inner diameter side and an outer diameter side. A plurality of first radial slits are formed across the outer diameter side. A second flat piece layer is disposed in a layered configuration with the first flat piece layer and is formed of the flexible rubber material. The second flat piece layer includes an inner diameter side and an outer diameter side, wherein a plurality of second radial slits are formed across the second layer outer diameter side, and wherein the second radial slits are offset from the first radial slits in the layered configuration. The inner diameter sides of the first flat piece layer and the second flat piece layer are secured to the annular air shield such that the layered configuration is engaged with the stator end winding.

In yet another exemplary embodiment of the invention, a generator includes a stator having a stator end winding, an annular air shield disposed radially inward of the stator end winding, and the seal according to the invention attached to the annular air shield and engaged with the stator end winding.

DETAILED DESCRIPTION OF THE INVENTION

Figure 1:
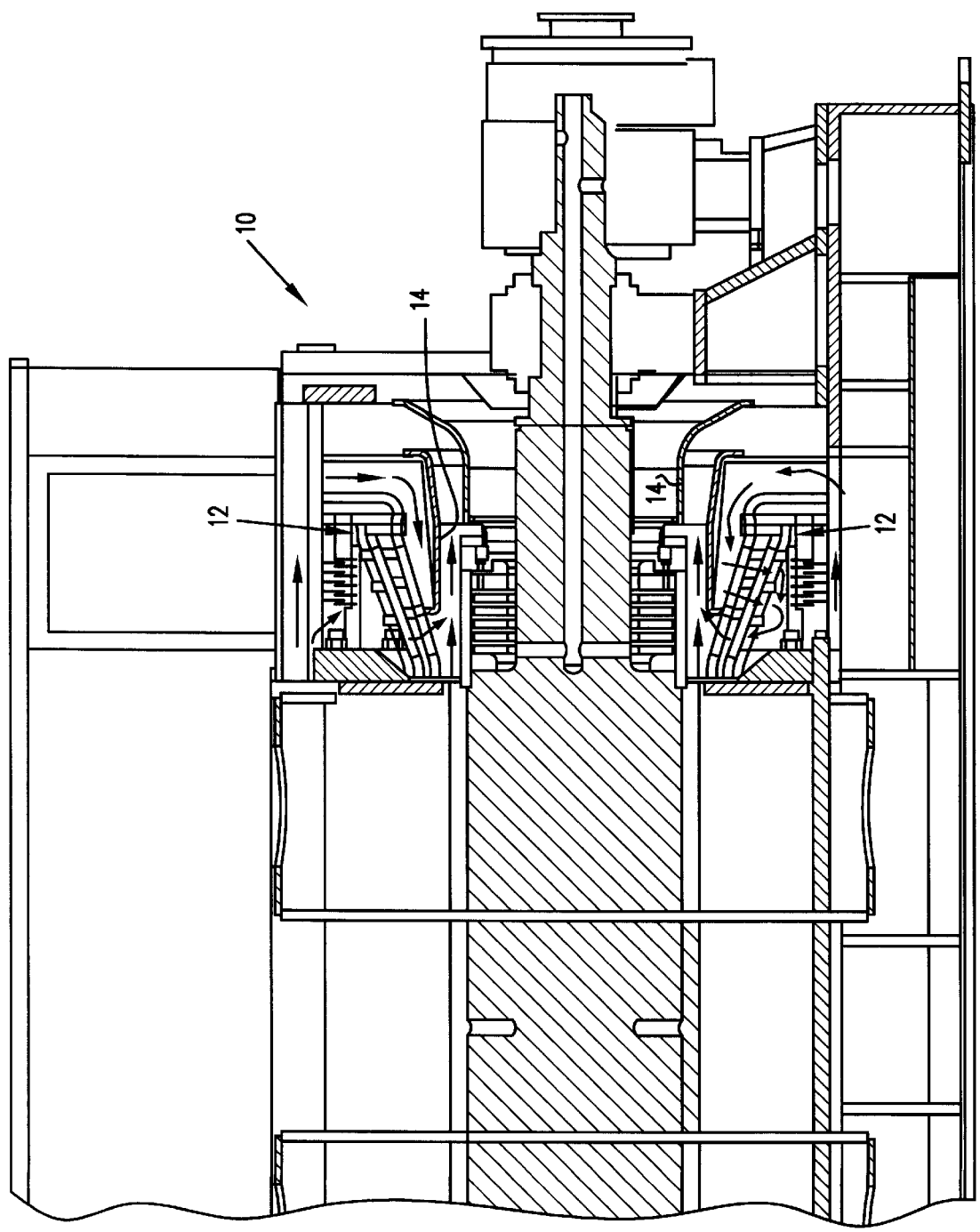
FIG. 1 is a cross-sectional view showing an air flow path in a reverse flow generator.
Figure 2:
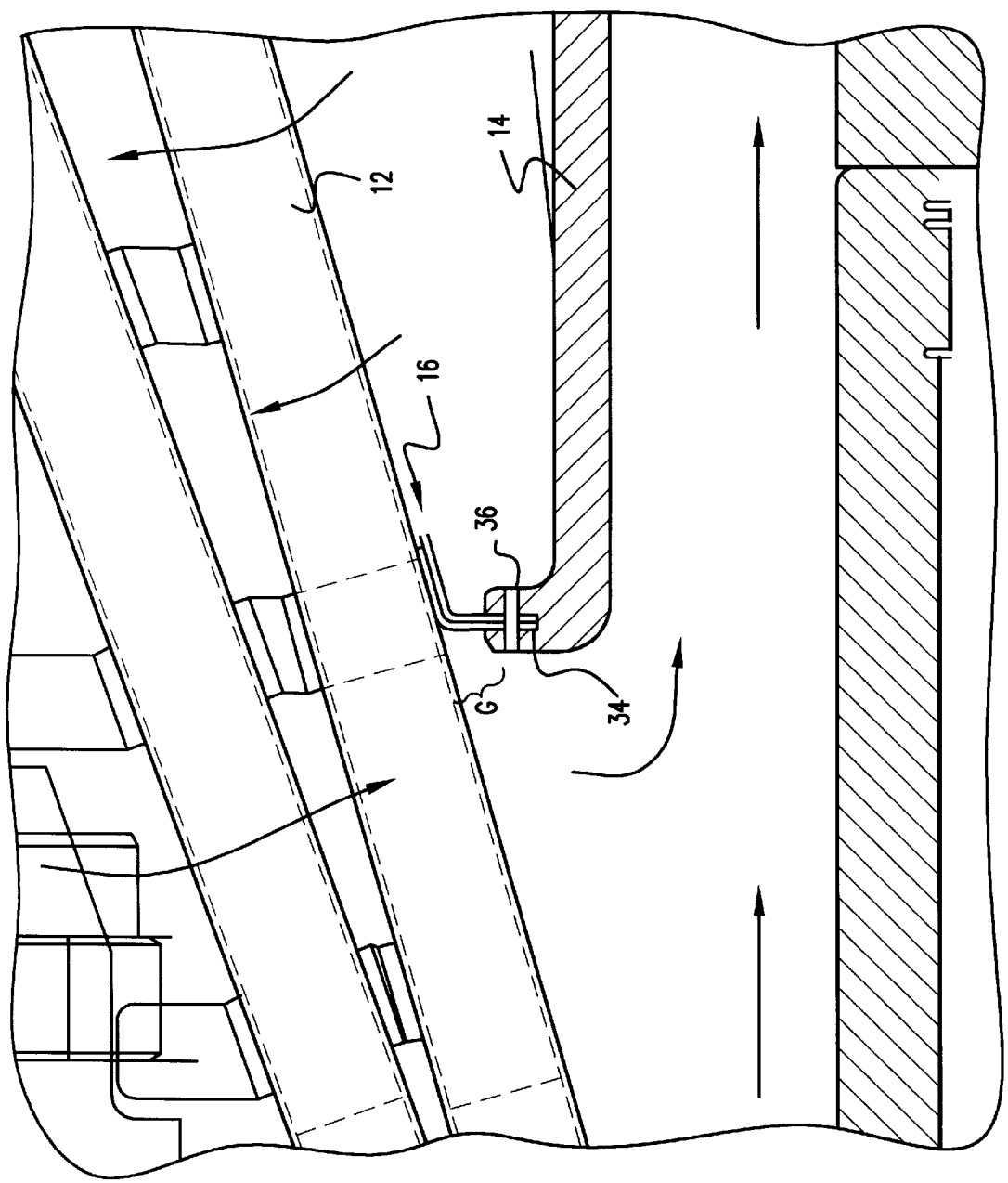
FIG. 2 shows the seal arrangement for a generator stator end winding according to the present invention.
Figure 3:
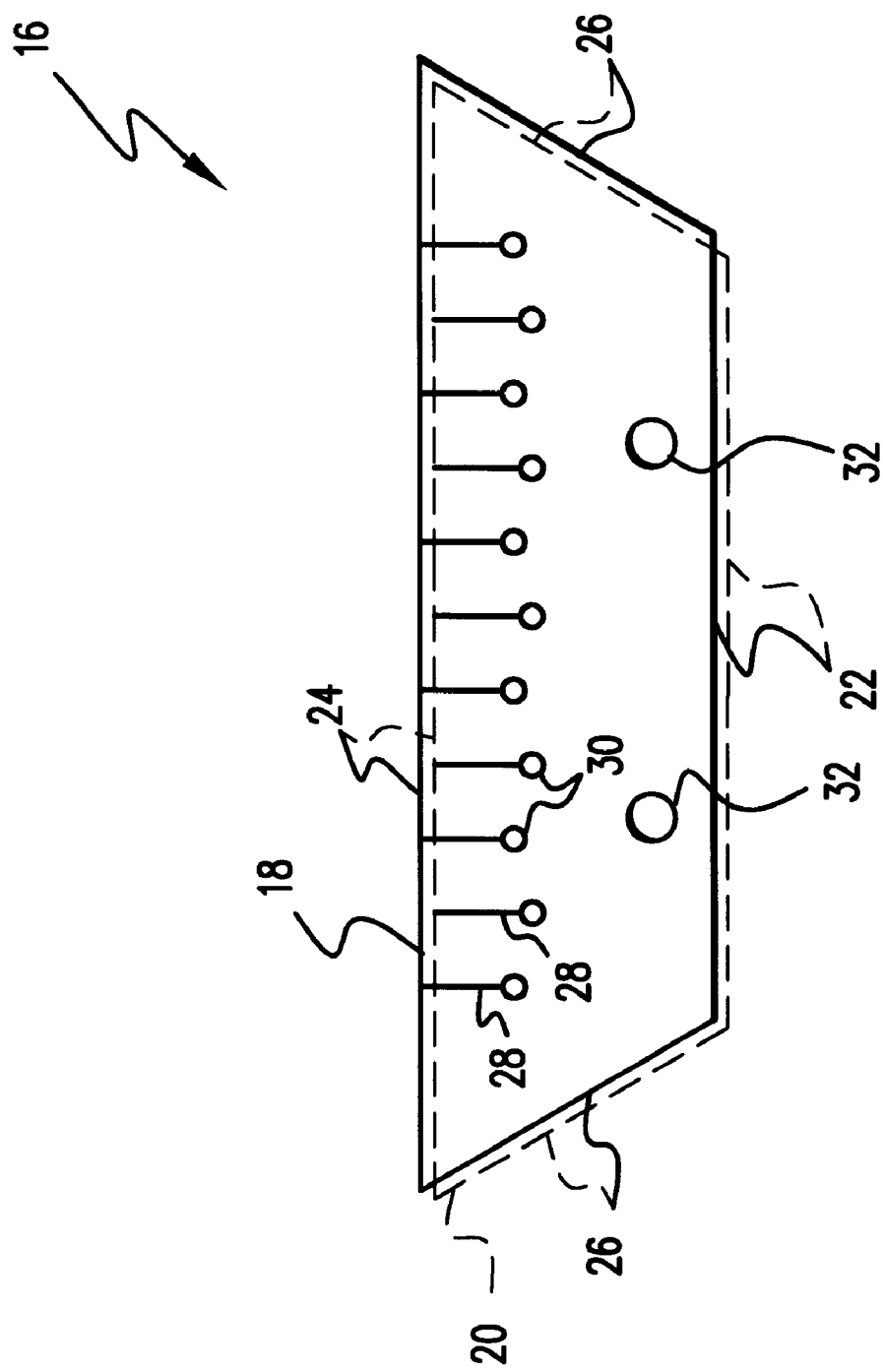
FIG. 3 is a detailed view of the rubber seal segment according to the invention.

Referring now to FIGS. 1–3, a reverse flow generator 10 includes a rotor and a stator, which includes a stator end winding 12. An air shield 14 is disposed adjacent an end winding inner surface as shown in FIG. 1, radially inward of the stator end winding 12. In order to effect proper cooling of the end winding, air flow is directed along a path adjacent the air shield 14 and across the stator end winding 12. An exemplary air flow path is illustrated by the arrows in FIG. 1. To ensure proper air flow, it is necessary to seal a gap between the air shield 14 and the stator end winding 12.

FIG. 2 is an enlarged view of the circled portion in FIG. 1, illustrating the gap G between the stator end winding 12 and the air shield 14. A seal 16 according to the invention is secured to the air shield 14 and engages an inner surface of the stator bar end winding 12 to seal the gap G.

FIG. 3 illustrates the construction of the seal 16 according to the invention. The seal 16 is formed of two flat piece layers 18, 20 (the second layer 20 being shown in phantom) disposed in a layered configuration. Each flat piece layer 18, 20 includes an inner diameter side 22 and an outer diameter side 24 and ends 26 cut at an angle as shown in FIG. 3. The shape and sizing of the flat piece layers 18, 20 define a segment of a circumferential seal such that a plurality of segments are aligned end-to-end attached to the air shield 14. The flat piece layers 18, 20 are preferably about ⅛" thick and about 3" wide and are formed of a silicon rubber. Of course, other dimensions and materials will be contemplated by those of ordinary skill in the art, and the invention is not meant to be limited to these specific dimensions and material.

A plurality of radial slits 28, preferably about 1" long, are formed across the outer diameter sides 24 of the flat piece layers 18, 20. The slits 28 are configured such that in the layered configuration of the seal, second radial slits 28 of the second flat piece layer 20 are offset from first radial slits 28 of the first flat piece layer 18 as shown in FIG. 3. The slits 28 enable the seal to accommodate for end winding inner surface irregularities, while maintaining an effective seal. A stress release hole 30 is formed at radially inward ends of the slits 28 to prevent the slits from being torn during operation of the generator. Each of the flat piece layers 18, 20 is also provided with at least one locking dowel hole 32 that receives a dowel for securing to the air shield 14.

As shown in FIG. 2, a radial or circumferential groove 34 is machined in an end portion of the air shield 14. The radial groove 34 is sized to receive the layered configuration of the flat piece layers 18, 20 and segments thereof in side-by-side relation to form a circumferential seal. The layered configuration is secured to the air shield in any suitable manner and preferably via a locking dowel 36 fitted through an aperture in the air shield and through the locking dowel holes 32 in the seal 16. The seal 16 may additionally or alternatively be secured with an adhesive in the air shield groove 34. In operation, the inner diameter sides 22 of the flat piece layers 18, 20 are secured in the groove 34 of the air shield, and the layered configuration of the seal is engaged with the stator end winding 12 to seal the gap G.

With this structure, a reliable seal prevents air leakage between the air shield and the inner surface of the stator bar end winding using a simple construction of materials that is easy and inexpensive to manufacture and install.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A seal for a generator stator end winding, the seal comprising:
   a first flat piece layer formed of a flexible rubber material and having an inner diameter side and an outer diameter side, wherein a plurality of first radial slits are formed across the outer diameter side; and
   a second flat piece layer disposed in a layered configuration with the first flat piece layer, the second flat piece layer being formed of the flexible rubber material and having an inner diameter side and an outer diameter side, wherein a plurality of second radial slits are formed across the outer diameter side, and wherein the second radial slits are offset from the first radial slits in the layered configuration.

2. A seal according to claim 1, further comprising a stress release hole at radially inward ends of each of the first radial slits and the second radial slits.

3. A seal according to claim 2, wherein ends of the first flat piece layer and the second flat piece layer are cut at an angle, and wherein the layered configuration of the first flat piece layer and the second flat piece layer comprises one segment such that a plurality of segments are aligned end to end to form a circumferential seal.

4. A seal according to claim 3, wherein each of the first flat piece layer and the second flat piece layer comprises at least one locking dowel hole for cooperating with a locking dowel.

5. A seal according to claim 1, wherein the flexible rubber material is silicon rubber.

6. A seal arrangement for a generator stator end winding including an annular air shield spaced from the end winding, the seal arrangement comprising:
   a first flat piece layer formed of a flexible rubber material and having an inner diameter side and an outer diameter side, wherein a plurality of first radial slits are formed across the outer diameter side; and
   a second flat piece layer disposed in a layered configuration with the first flat piece layer, the second flat piece layer being formed of the flexible rubber material and having an inner diameter side and an outer diameter side, wherein a plurality of second radial slits are formed across the outer diameter side, and wherein the second radial slits are offset from the first radial slits in the layered configuration,
   wherein the inner diameter sides of the first flat piece layer and the second flat piece layer are secured to the annular air shield such that the layered configuration is engaged with the stator end winding.

7. A seal arrangement according to claim 6, further comprising a stress release hole at radially inward ends of each of the first radial slits and the second radial slits.

8. A seal arrangement according to claim 7, wherein ends of the first flat piece layer and the second flat piece layer are cut at an angle, and wherein the layered configuration of the first flat piece layer and the second flat piece layer comprises one segment such that a plurality of segments are aligned end to end to form a circumferential seal.

9. A seal arrangement according to claim 8, wherein the annular air shield comprises a circumferential groove in an inboard end thereof, and wherein the plurality of segments are disposed in the circumferential groove.

10. A seal arrangement according to claim 9, wherein the plurality of segments are secured in the circumferential groove with an adhesive and a locking dowel, and wherein each of the first flat piece layer and the second flat piece layer comprises at least one locking dowel hole for cooperating with the locking dowel.

11. A seal arrangement according to claim 6, wherein the flexible rubber material is silicon rubber.

12. A generator comprising:
   a stator including a stator end winding;
   an annular air shield disposed radially inward of the stator end winding; and
   a seal attached to the annular air shield and engaged with the stator end winding, the seal including:
      a first flat piece layer formed of a flexible rubber material and having an inner diameter side and an outer diameter side, wherein a plurality of first radial slits are formed across the outer diameter side, and
      a second flat piece layer disposed in a layered configuration with the first flat piece layer, the second flat piece layer being formed of the flexible material and having an inner diameter side and an outer diameter side, wherein a plurality of second radial slits are formed across the outer diameter side, and wherein the second radial slits are offset from the first radial slits in the layered configuration.

* * * * *